Nov. 21, 1939. J. A. ORR Re. 21,274
ELECTRIC CUTTER AND TRIMMER
Original Filed Feb. 4, 1935 2 Sheets-Sheet 1
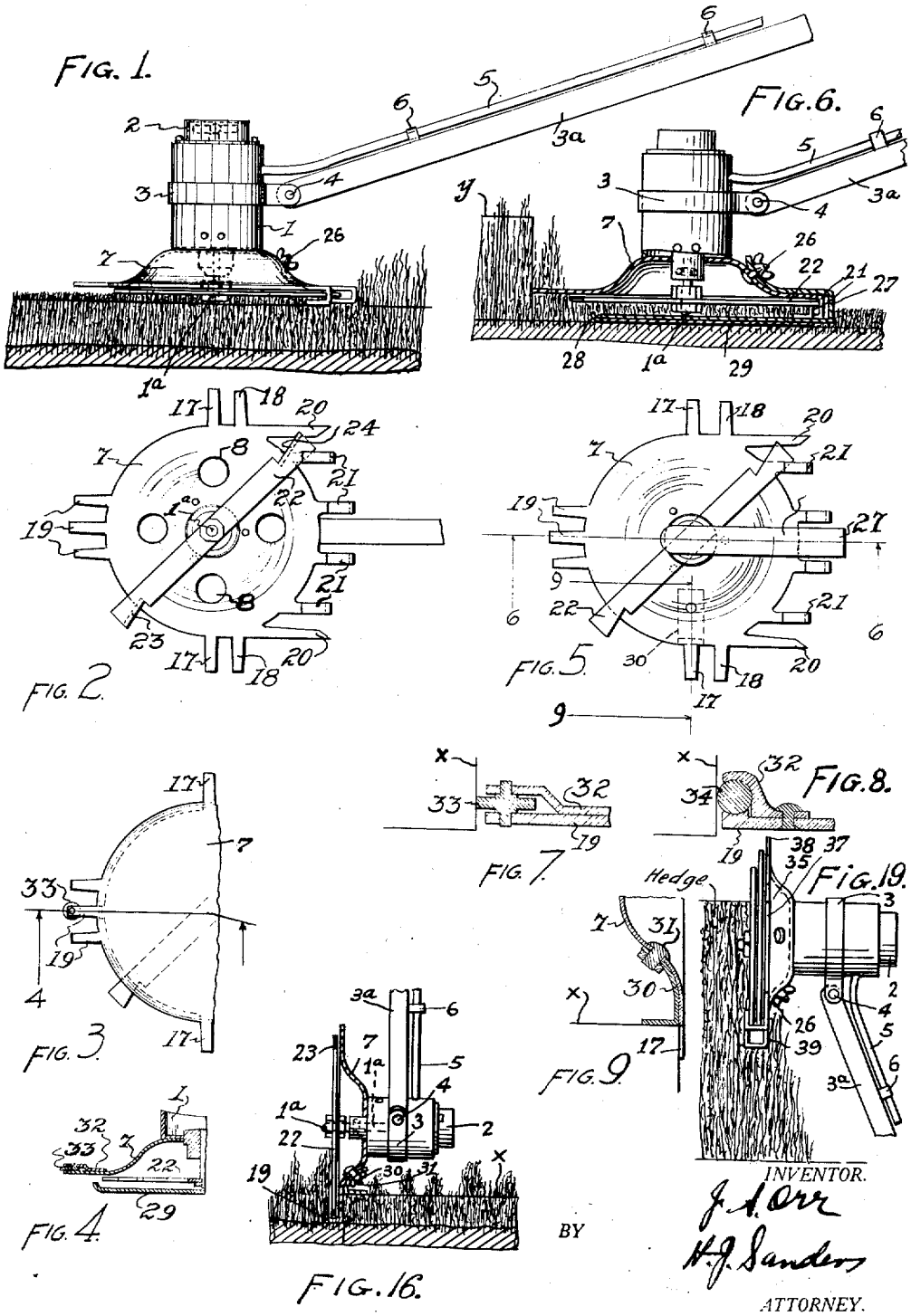
INVENTOR.
J. A. Orr
BY
H. J. Sanders
ATTORNEY.

Nov. 21, 1939.

J. A. ORR

Re. 21,274

ELECTRIC CUTTER AND TRIMMER

Original Filed Feb. 4, 1935

2 Sheets-Sheet 2

INVENTOR.

J. A. Orr

BY

H. J. Sanders

ATTORNEY.

Reissued Nov. 21, 1939

Re. 21,274

UNITED STATES PATENT OFFICE 21,274

ELECTRIC CUTTER AND TRIMMER

John A. Orr, Chicago, Ill.

Original No. 2,149,463, dated March 7, 1939, Serial No. 4,849, February 4, 1935. Application for reissue July 17, 1939, Serial No. 284,901

8 Claims. (Cl. 56—25)

This invention relates to improvements in combination or convertible electric grass cutters, edgers and trimmers. One object is to provide an implement of this type that is positive and efficient in operation, that is composed of few parts, durable in use, inexpensive to manufacture, light in weight, and that can be readily used by anyone of ordinary intelligence.

A further object is to provide a portable implement of this type that may be adjusted to cut vertically, horizontally or at any angle therebetween, means being provided for releasably locking the implement in any adjusted position.

A still further object is to provide a cutter, edger and trimmer that when moved horizontally will cut grass, whether moved laterally or toward and away from the operator; and that when moved with the cutter or blade disposed in a vertical or oblique position will cut a straight edge, or cut a furrow alongside a curb, sidewalk or like object.

A still further object is to provide an implement of this type wherein the material to be cut is drawn in or toward the cutter and wherein provision is made against the possibility of clogging or impeding the movement of the cutter.

A further object is to provide a cutter, edger and trimmer that may be manipulated with one hand, that may slide upon a runner or base plate riding over the ground; or that may be swung above the ground to permit contact of the cutting element with the material to be cut. A further object is to provide an electric implement of this type having a fan-cooled motor, the fan being attached to the outer end of the motor whereby cool currents of air are directed against the motor brushes.

With the foregoing and other objects in view, the invention consists in the combination and arrangement of parts to be hereinafter fully described, pointed out in the claims and illustrated in the accompanying drawings which form a part of this application for patent and in which—

Fig. 1 is a view in side elevation of the device showing its use as a grass cutter or trimmer, the movement being horizontal.

Fig. 2 is an inverted plan view of the cutter and trimmer.

Fig. 3 is a view similar to Fig. 2 but showing a modified form of the implement.

Fig. 4 is a cross sectional view taken on the line 4—4 of Fig. 3.

Fig. 5 is an inverted plan view of a further slightly modified form of the implement.

Fig. 6 is a vertical sectional view through Fig. 1.

Fig. 7 is an enlarged sectional detail view of a guide roller sometimes employed, showing its application.

Fig. 8 is a view similar to Fig. 7 but showing a ball bearing instead of the roller.

Fig. 9 is an enlarged fragmentary sectional view through Fig. 5, on the line 9—9 thereof.

Fig. 16 is a view of the device illustrating its use as a marker or edger and a furrow cutter, the knife rotating in a vertical plane.

Fig. 19 is an elevational view of the device disposed vertically and in use upon the hedge.

Like reference characters denote corresponding parts throughout the several views.

Figure 18:
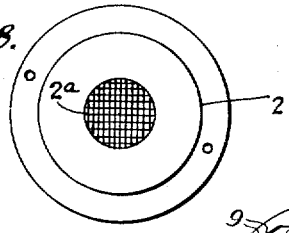
Fig. 18 is a plan view of the cap.
Figure 10:
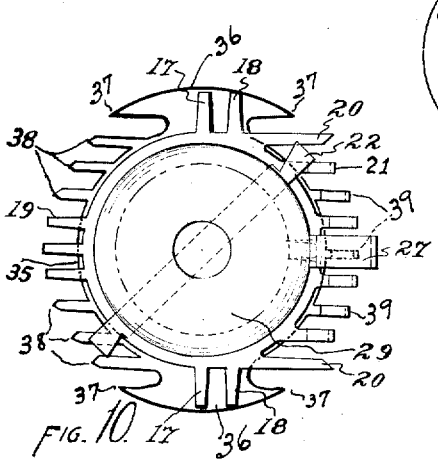
Fig. 10 is a view similar to Fig. 3, of a further slightly modified form, with tooth collar added.

The reference numeral 1 denotes the housing of the motor C to one end of which the fan housing 2 is secured that carries the fan 1b, the outer end of said fan housing being perforated and provided with the screen 2a to admit air and screen out dust and clippings. The air entering the fan housing is directed by the fan upon the motor brushes thus cooling the motor in a most efficient manner. A metal strap 3 encircling the motor housing is adjustably connected to the sectional handle 3a by the screw bolt 4 thus providing means for locking the handle in any adjusted position. The electric cord 5 running to the motor is secured by clips 6 to the handle, said cord running to an electric outlet.

Figure 12:
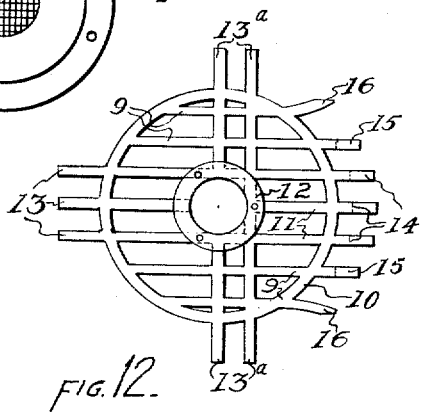
Fig. 12 is a top plan view of a modified form of bell-shaped housing that may be employed.

Secured to one end of the motor housing is the bell-shaped skirt or bottom which may be formed of one piece of material 7 provided with perforations 8 as shown in Figs. 1 and 2; or of skeleton form of Fig. 12 having wires 9, or guards, bent bell-shaped and with their ends secured to the ring 10 and wires 11 similarly bent and secured both to the rings 10 and 12. The wires 11 extend beyond the ring 10 and each wire 11 has one square end 13 and one down-turned hook end 14. The innermost wires 9 have one end terminating in the ring 10 and the opposite end extending therebeyond and curved laterally as at 16. Wires 13a connect the rings 10, 12 and extend beyond the ring 10 and meet the wires 9, 11 at right angles.

The one-piece skirt 7 is formed with diametrically opposed blade-end guards 17 and 18 and at points substantially ninety degrees from the guards 17 with a plurality of similar guards 19. Upon the opposite side of the guards 17, 18 with respect to the guards 19 are the straight outer guards 20 and spaced parallel hooked guards 21. Secured to the reduced outer end of the motor shaft 1a is the rotary blade 22 spaced slightly outward from the skirt 7, the blade ends passing through the hooks 21 as the blade rotates. In the wire skirt of Fig. 12 the blade 22 is similarly carried and disposed beyond the bell and passes through the hood ends 14, 15. The motor housing is round in cross-section and the bell-shaped skirt 7 is integral with or secured to one end thereof and concentric therewith and the motor shaft extends substantially centrally and longitudinally through said members.

The blade 22 is formed with two cutting edges 23 and 24, one at each end, said edges being disposed upon relatively opposite lateral sides of the blade, the beveled side of the blade being disposed adjacent the bell-shaped bottom with the cutting edges disposed outwardly with respect thereto. Due to the particular bevel of the blade, rotation of the same at high speed draws air inwardly toward the skirt thus feeding into the cutting element the light blades of grass and similar matter. The perforations 8 in the bell-shaped housing 7 of Figs. 1 and 2 and the spaces between the wires 9 and 11 of Fig. 12 provide outlets for the air currents drawn in by the blade.

The bell-shaped housing prevents such accumulation of clippings and sap as might interfere with the free movement of the blade. The positioning of the blade so that the beveled portions are directed away from the bell skirt will direct air currents away from the same. High speed rotation of the blade causes the finely cut material, and sap bled therefrom, to be precipitated against the housing end and if the same were not bell-shaped and clearance and blade edge positioning thus provided, the cutting operation would be interfered with.

Figure 14:
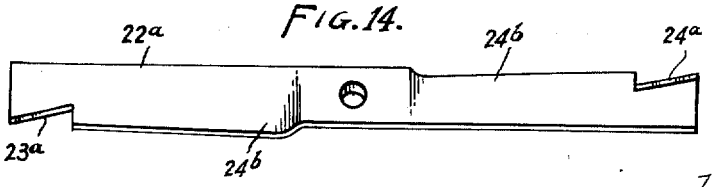
Fig. 14 is a fragmentary view of a modified form of blade sometimes employed.

In Fig. 14 a modified form of blade is shown. This blade 22a is formed with cutting edges 23a, 24a, similar to the cutting edges 23, 24, and with a bent or propeller-shaped portion 24b that extends from each cutting edge almost to the longitudinal center of the blade. In this form of blade, a greater amount of air is drawn inwardly by blade rotation.

Figure 11:
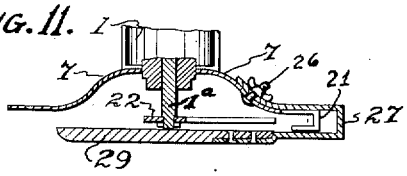
Fig. 11 is a cross sectional view through Fig. 10, with the toothed collar removed.
Figure 13:
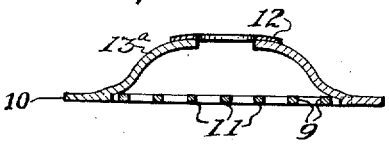
Fig. 13 is a cross sectional view through Fig. 12.
Figure 17:
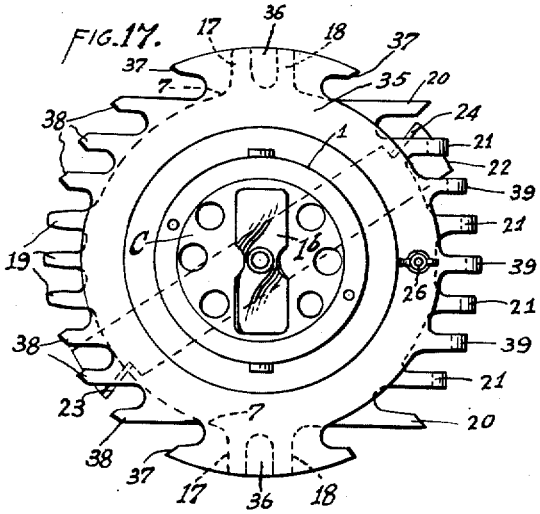
Fig. 17 is a top plan view of the device with the cap removed.

Removably secured to the bell-shaped housing 7 by a wing nut 26 is the runner 27 that is bent back beneath the skirt or bell housing and that extends beyond the center of the housing, the free end 28 thereof being bent slightly inwardly or toward the housing. In cutting grass the implement may be moved over the ground upon the runner to properly space the blade above the ground so that the cutter may closely follow the topography of the ground and cut evenly. A runner plate 29 circular in shape and with a beveled perimeter may be secured to the inner end of the runner 27 to travel over the ground to eliminate lateral movement of the implement in operation. This runner is in this instance shortende slightly to receive the plate 29, as shown in Fig. 11, and is secured by a wing nut 26 to the bell-shaped housing. This form is interchangeable with the runner 27 shown alone in Fig. 6. With the runner plate there is less necessity for manual guidance of the tool.

In cutting at spaced distances from objects, as curbs, headstones, etc. with the blade in horizontal position the implement is so disposed with relation to the object that the guards 17, 18 have their ends abutting the object to properly space the blade therefrom, or the guards 19 or 20 may be so disposed to guide the blade.

In cutting a furrow contiguous to sidewalks and like objects the blade is disposed in a vertical position with the bell housing over the sidewalk, any of the sets of guards sliding along the edge of the walk, the blade then being disposed outwardly from the walk with respect to the guards. By removing the runner 27, the implement may be manually moved upon the hooks 21 over stone walks, grave markers and like objects X to cut the grass lying thereupon or therebetween. The hooks now serve as runners and prevent the blade from striking the object, the blade being disposed outwardly with respect to the object X as shown in Fig. 1.

For use along curbs, roadways and the like an angular guide 30 is secured by rivet 31 to the bell housing as a depth guide for the blade to determine the depth of cut to be made as shown in Fig. 9, the guards 17 riding along the edge of the object X and the blade cutting outwardly therefrom. As shown in Fig. 7 a guard 19 may have a clip 32 secured thereto, to carry a spacer roller 33 that may ride against the curb or other object X to prevent scratching of the same as might otherwise occur; or as shown in Fig. 8 a ball bearing 34 may be likewise secured to any guard 17 or 19 for the same purpose. The large or toothless open spaces of the bell housing between the guards 19 and 17 or between the guards 13 and 13a allow the blade to cut grass regardless of the direction in which the implement is moved and allow the blade to throw the grass free to prevent clogging which might otherwise occur.

Figure 15:
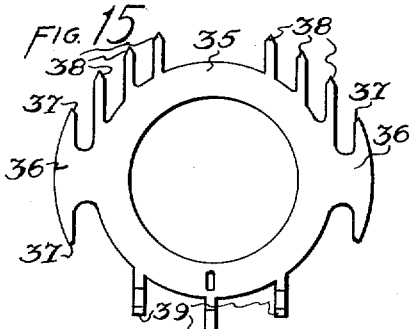
Fig. 15 is a plan view of the toothed collar.

For converting the grass cutter and edger into a hedge trimmer, a tooth plate or collar 35 as shown in Fig. 15 is attached directly to the bell housing. This collar is applied over the handle and motor housing upon the top of the bell-shaped housing by means of wing nut 26, the runner 27 having been removed. The collar 35 is formed with oppositely disposed extensions or neck portions 36, each having laterally extending offset teeth 37 and between the teeth 37 along one outer edge of the collar the same is formed with two groups of teeth, each group comprising three offset teeth 38, the groups being so spaced apart that the teeth thereof lie between the guards 17 and 19 of the bell housing 7 or between the guards 13 and 13a of the wire housing of Fig. 12.

The teeth of the collar 35 now cooperate with the guards of the bell-shaped housing to hold branches while they are being cut by the knife. The collar 35 is formed also with offset guard hooks 39 disposed upon the opposite side of the necks 36 with respect to the teeth 38, said guard hooks 39 and teeth 38 lying in the plane of the guards and guard hooks of the bell-shaped housing to effect cooperation therewith and to serve as a safety feature to prevent a broken blade from flying outwardly toward the operator to do him bodily injury.

What is claimed is:

1. In a cutter and trimmer, a motor having a cylindrical housing, a bell-shaped skirt secured to one end of said housing provided marginally with guards, said guards being arranged in groups spaced apart, a shaft positioned substantially centrally of said housing and skirt, a toothed collar removably secured to said skirt, the teeth of said collar being offset for disposition between the groups of guards of said skirt in the common plane thereof, a cutter secured to said shaft moving transversely across said guards and teeth when the shaft is rotated, and a handle secured to said motor housing.

2. In an electric cutter and trimmer, a motor having a substantially cylindrical housing, a bell-shaped skirt secured to said housing, its marginal portions being provided with guards, a shaft positioned substantially centrally of said housing and skirt, a spacer roller secured to one guard and operative in the horizontal position of the same, a guide secured to said skirt, a cutter secured to said shaft and extending from the same across the said skirt and having beveled and sharpened portions moving transversely across the guards when the shaft is rotated, and a handle adjustably secured to said motor housing.

3. In an electric cutter and trimmer, a motor having a substantially cylindrical housing, a skirt at one end thereof, a motor shaft extending substantially centrally of said housing and skirt, straight guards formed peripherally on said skirt, hooked guards formed peripherally on said skirt substantially opposite said straight guards, a spacer roller carried by one straight guard contiguous to the skirt periphery, a rotary cutter fast to said shaft for movement transversely of said straight guards and through the ends of said hooked guards as said shaft is rotated, and a handle for said housing.

4. In a cutter and trimmer, a motor having a shaft, a housing for said motor, a bell-shaped skirt secured to the lower end of said housing, downwardly disposed hooked guards carried by said skirt and terminating therebeneath in spaced relation thereto, a rotary cutter secured to said motor shaft and disposed between the lower end of said skirt and the free ends of said hooked guards, a runner secured to said skirt and extending therebeneath and beneath said hooked guards, and a disc-like circular runner plate secured flush to said runner for travel over the ground.

5. In a grass cutter of the manually portable type, a rotatable blade for the cutter, means for driving the same, a disk-like support spaced from the blade and having a substantially flat ground riding face wholly unobstructed and adapted to closely follow the ground topography as it is moved there-over in any direction, and means for securing said support to the cutter.

6. In a grass cutter of the manually portable type, a motor, a rotatable blade connected to the motor, a support spaced from the blade and having a substantially flat ground riding face wholly unobstructed and adapted to closely follow the ground topography as it is moved there-over in any direction, the support having a diameter less than the length of the blade, and means for securing said support to the cutter, said means comprising adjustable and removable clamping and locking elements.

7. An electric grass cutter and trimmer, comprising a housing, a motor on the housing, a cutting blade rotatably positioned beneath the housing and driven by the motor, a cutter supporting plate spaced from the blade and adapted to be moved over the ground and to follow the ground topography as the cutter is operated, the blade being sharpened at its ends, which ends project beyond the periphery of the plate and combined guard means for the blade and supports for the ground plate.

8. An electric grass cutter and trimmer, comprising a housing, a bell-shaped skirt depending from the housing, a motor on the housing, a cutting blade rotatably positioned beneath the housing and driven by the motor, the ends only of the cutting blade being sharpened and beveled so that in high speed rotation, a current of air is directed outwardly beneath the edge of the skirt housing and a supporting plate adapted to be moved over the ground and to follow the ground topography as the cutter is operated, and combined guard means for the blade and supports for the ground plate, said guard and support means being adjustable and removably mounted on the housing.

JOHN A. ORR.